United States Patent
Goott et al.

(10) Patent No.: US 8,185,743 B1
(45) Date of Patent: May 22, 2012

(54) SYSTEMS AND METHODS FOR APPLICATION LOCKING USING AN INTERNAL AND EXTERNAL CHECKSUM

(75) Inventors: Paul A. Goott, Bridgewater, NJ (US); Alan Socolow, Toms River, NJ (US); Shree Verma, Dayton, NJ (US); Cheryl Neal, Pennington, NJ (US); Zeba Hyder, New York, NY (US); Michael J. Hemingway, South Bound Brook, NJ (US)

(73) Assignee: Household Life Insurance Company, Jersey City, NJ (US)

( * ) Notice: Subject to any disclaimer, the term of this patent is extended or adjusted under 35 U.S.C. 154(b) by 924 days.

(21) Appl. No.: 12/188,877

(22) Filed: Aug. 8, 2008

Related U.S. Application Data

(60) Provisional application No. 60/964,281, filed on Aug. 10, 2007.

(51) Int. Cl.
*H04L 9/32* (2006.01)
*H04L 29/06* (2006.01)
*G06Q 10/00* (2006.01)

(52) U.S. Cl. ............. 713/176; 713/156; 705/75; 705/76

(58) Field of Classification Search .................. 726/156, 726/176, 155; 705/75, 76
See application file for complete search history.

(56) References Cited

U.S. PATENT DOCUMENTS

| | | | |
|---|---|---|---|
| 6,263,436 B1* | 7/2001 | Franklin et al. ............... | 713/167 |
| 2002/0004800 A1* | 1/2002 | Kikuta et al. .................. | 707/500 |
| 2002/0143711 A1* | 10/2002 | Nassiri ........................... | 705/76 |

* cited by examiner

*Primary Examiner* — Philip Chea
(74) *Attorney, Agent, or Firm* — Stroock & Stroock & Lavan LLP

(57) ABSTRACT

Methods and systems for locking an application are described. A method includes receiving, over a communication network from a remote applicant, a signature for an application. The signature includes a date and time, an indication of agreement to the terms of the application, and verification information personal to the applicant and capable of confirming the applicant's identity. Based on the application and signature an internal checksum can be generated. The internal checksum is sent to a third party for generation of a second, external checksum. The external checksum is based on the internal checksum and the date and time the external checksum was generated. The internal and external checksums are associated with the application and then stored along with the application and signature.

22 Claims, 38 Drawing Sheets

Figure 12

| | | | | | | |
|---|---|---|---|---|---|---|
| $125,000 | $68.80 | $786.25 | [Select This Coverage!] | $94.60 | $1,081.09 | [Select This Coverage!] |
| $100,000 | $55.04 | $629.00 | [Select This Coverage!] | $75.68 | $864.88 | [Select This Coverage!] |
| $75,000 | $42.00 | $480.00 | [Select This Coverage!] | $57.75 | $660.00 | [Select This Coverage!] |
| $50,000 | $28.74 | $328.50 | [Select This Coverage!] | $39.52 | $451.69 | [Select This Coverage!] |

20-Year Term Life Insurance—Guaranteed Level Term

| | Quote without Return of Premium Rider | | | Quote with Return of Premium Rider | | |
|---|---|---|---|---|---|---|
| Face Amount | Monthly Premium | Annual Premium | | Monthly Premium | Annual Premium | |
| $250,000 | $78.75 | $900.00 | [Select This Coverage!] | $159.47 | $1,822.50 | [Select This Coverage!] |
| $225,000 | $70.88 | $810.00 | [Select This Coverage!] | $143.53 | $1,640.25 | [Select This Coverage!] |
| $200,000 | $63.00 | $720.00 | [Select This Coverage!] | $127.58 | $1,458.00 | [Select This Coverage!] |
| $175,000 | $55.13 | $630.00 | [Select This Coverage!] | $111.63 | $1,275.75 | [Select This Coverage!] |
| $150,000 | $47.25 | $540.00 | [Select This Coverage!] | $95.68 | $1,093.50 | [Select This Coverage!] |
| $125,000 | $39.38 | $450.00 | [Select This Coverage!] | $79.74 | $911.25 | [Select This Coverage!] |
| $100,000 | $31.50 | $360.00 | [Select This Coverage!] | $63.79 | $729.00 | [Select This Coverage!] |
| $75,000 | $24.28 | $277.50 | [Select This Coverage!] | $49.17 | $561.94 | [Select This Coverage!] |

Figure 13B

| | | | | $34.38 | $392.85 | Select This Coverage! |
|---|---|---|---|---|---|---|
| $50,000 | $16.98 | $194.00 | Select This Coverage! | | | |

15-Year Term Life Insurance--Guaranteed Level Term

| | Quote without Return of Premium Rider | | | Quote with Return of Premium Rider | |
|---|---|---|---|---|---|
| Face Amount | Monthly Premium | Annual Premium | | Monthly Premium | Annual Premium |
| $250,000 | $58.19 | $665.00 | Select This Coverage! | n/a | n/a |
| $225,000 | $52.37 | $598.50 | Select This Coverage! | n/a | n/a |
| $200,000 | $46.55 | $532.00 | Select This Coverage! | n/a | n/a |
| $175,000 | $40.73 | $465.50 | Select This Coverage! | n/a | n/a |
| $150,000 | $34.91 | $399.00 | Select This Coverage! | n/a | n/a |
| $125,000 | $29.09 | $332.50 | Select This Coverage! | n/a | n/a |
| $100,000 | $23.28 | $266.00 | Select This Coverage! | n/a | n/a |
| $75,000 | $18.77 | $214.50 | Select This Coverage! | n/a | n/a |
| $50,000 | $13.78 | $157.50 | Select This Coverage! | n/a | n/a |

10-Year Term Life Insurance--Guaranteed Level Term

Figure 13C

10-Year Term Life Insurance--Guaranteed Level Term

| | Quote without Return of Premium Rider | | | Quote with Return of Premium Rider | |
|---|---|---|---|---|---|
| Face Amount | Monthly Premium | Annual Premium | | Monthly Premium | Annual Premium |
| $250,000 | $48.78 | $557.50 | Select This Coverage! | n/a | n/a |
| $225,000 | $43.90 | $501.75 | Select This Coverage! | n/a | n/a |
| $200,000 | $39.03 | $446.00 | Select This Coverage! | n/a | n/a |
| $175,000 | $34.15 | $390.25 | Select This Coverage! | n/a | n/a |
| $150,000 | $29.27 | $334.50 | Select This Coverage! | n/a | n/a |
| $125,000 | $24.39 | $278.75 | Select This Coverage! | n/a | n/a |
| $100,000 | $19.51 | $223.00 | Select This Coverage! | n/a | n/a |
| $75,000 | $17.00 | $194.25 | Select This Coverage! | n/a | n/a |
| $50,000 | $12.43 | $142.00 | Select This Coverage! | n/a | n/a |

Questions? Call toll-free (866) 667-0561

| Application Review (5046359TX) - Microsoft Internet Explorer |

Weight: 165 pounds
Social Security Number: 540 - 24 - 1540
Address: 1 Oak
Lou    TX 40242
Phone Number: 502 426 - 8415
Email Address: vcurtis@inviva.com
Driver's License State: TX

Beneficiary
*Primary*
Name: Testco
Relationship: Estate
Percentage: 100
*Contingent*

Plan Applied For
Term: 20 years

Additional Coverage Applied For
None

Coverage Amount
$150,000.00

Payment Frequency

Figure 21B

Coverage Amount $150,000.00

Payment Frequency

- ○ One annual payment of $540.00   Best Value!
- ○ Two semi-annual payments of $275.40
- ○ Four quarterly payments of $140.40
- ⊙ Twelve monthly payments of $47.25

Payment Method

Credit Card: Visa

Account Number: 4445222299990007

Expiration Date: 12 / 2025

Replacement

Do you plan to replace, change or modify any existing life insurance as a result of this application? (If yes, additional forms may be required, depending upon state requirements)    Yes · No

Underwriting Infomation

1. In the past 12 months have you smoked cigarettes, cigars, pipes or used tobacco or nicotine in any form including snuff, dip, chew, nicotine patch, gum, or other substitutes?    Yes · No
2. In the past 5 years, have you had or been treated for or consulted a physician or other practitioner for any of the following: heart or coronary artery disease or disorder, stroke, peripheral vascular disease, cancer, diabetes, hepatitis C, cirrhosis, pancreas disease or disorder, emphysema or chronic lung or pulmonary disease (COLD or COPD), alcohol or drug use?    ○ Yes ⊙ No

Figure 21C

SYSTEMS AND METHODS FOR APPLICATION LOCKING USING AN INTERNAL AND EXTERNAL CHECKSUM

CROSS-REFERENCE TO RELATED APPLICATIONS

This application claims the benefit under 35 U.S.C. 119(e) of U.S. Provisional Patent Application No. 60/964,281 filed on Aug. 10, 2007 entitled "Electronic signature process and system for same," which is hereby incorporated by reference herein in its entirety.

BACKGROUND OF THE INVENTION

1. Field of the Invention

The invention relates generally to application processing systems with verified electronic or voice signatures, and locking of an application, for tamper protection, using internal and external checksums.

2. Description of the Related Art

When making transmission of information from one person to another, for example, email, it is useful to be able to confirm the identity of the sender. One way of performing this identification is using public key cryptography. Public key cryptography relies on public and private keys to sign a message. Each individual has both a private key and a public key, this correspondence between an individual and their keys is set up using the public key infrastructure (PKI) (e.g. a certificate authority). Messages are encoded with one key (e.g. the public key), and can only be decoded with the other key (e.g. the private key). In this way, the receiver of a message can confirm the identity of a sender, since only the corresponding key can decode the message. Algorithms that can be used to encode messages include the RSA algorithm.

One way of securing the integrity of transmissions is through the use of checksums. For example, when transmitting a binary message a parity bit can be used that represents whether the number of 1's in the message is even. If a 0 in the message is changed to a 1 during transmission, this can then be detected by a parity bit that is incorrect for the received message. Another example is a cyclical redundancy check (CRC). This is a code that can be appended to a message so that changes in the transmission can be detected. The CRC code is compared to the code generated for the received message. If the codes do not match, then the receiver knows that the received message is not that same as the transmitted message.

Another example of method for securing the integrity of a message is a hashing function. A hashing function computes a number (or other smaller message) for a longer message. Similar to a CRC code, if the receiver does not generate the same hash value for the received message, it can determine that the message has been altered. One group of hash functions are the SHA (Secure Hash Algorithm) hash functions. Another group of hash algorithms are the message digest algorithms (e.g. MD5).

Insurance applications can be applied for by many methods, including in person, through the mail, electronically over the Internet, or through the phone either using an agent or an interactive voice response system. Submitting applications electronically over the internet or through the phone has the benefit of being convenient for the applicant. Because the applicant is not able to physically sign the application, as they can in person or through the mail, these applications can be signed either electronically (e.g. the typing of a name or certain statement) or through the phone (e.g. stating "I agree"). The signature on an application serves to show the applicant's agreement to terms of the application. However, the signature does not solve the need to be able to confirm at a later date what the terms of the application were, and to ensure that the signed application has not been altered in any way.

SUMMARY OF THE INVENTION

Methods and systems for locking an application are described. An embodiment of the invention includes receiving, over a communication network from a remote applicant, a signature for an application. The signature can include any number of elements, including a date and time, an indication of agreement to the terms of the application, verification information personal to the applicant and capable of confirming the applicant's identity, identification information (e.g. phone number, browser information, IP address), and an automatically generated application number or other tracking information. Based on the application and signature an internal checksum can be generated. The internal checksum is sent to a third party for generation of a second, external checksum. The external checksum is based on the internal checksum and the date and time the external checksum was generated. The internal and external checksums are associated with the application and then stored along with the application and signature.

In some embodiments of the invention, the indication of agreement to the terms of the application is a verbal response from the applicant, entered by the applicant through a telephone keypad or entered through a graphical user interface of a computer system. Similarly, the verification information can be a driver's license number, a social security number, or a PIN number. In other embodiments, the external checksum can be generated using public key cryptography. Alternatively, a Secure Hash Algorithm can be used to generate the external checksum. The same method can be used to generate the internal checksum. Other information on which the external checksum can be based includes, the application itself, the signature, and information identifying the source of the internal checksum.

Other embodiments of the invention include receiving an application from an applicant as well as a signature for the application. The signature and application can be completed through the phone, electronically, or through the mail, including any combination of those methods. The signature can be as basic as using a button on a graphical interface to indicate agreement to the terms of an application. To prevent external tampering an internal checksum can be generated. In this way, no third party would be able to modify the application without the modification being detected. To prevent internal tampering, a second external checksum can be generated. This external checksum can be based on any number of items, include the application, the signature, and the internal checksum.

In certain embodiments of the invention the signature can be completed verbally through the phone with or without use of the keypad. In other embodiments, the application can be completed over the Internet. Verification information can also be included in the signature so that an applicant's identity can be confirmed.

The above embodiments can be used to generate a locked application protected against internal and external tampering. The use of checksums makes any modification to the application and/or signature detectable. In those cases, the checksum, for example a hash value, will not longer correspond with the application and/or signature data when regenerated. Voice signatures and information can be included by digitizing. Similarly, an application or signature submitted by paper can also be digitized and used with embodiments of the invention. Verification information can be provided by the applicant (e.g. a social security number) or collected automatically by the system (e.g. an IP address or caller ID phone number).

There are many known methods of calculating the checksum, including using a secure hash algorithm or public key cryptography. These methods may be combined together or used separately depending on the system.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 12 is a user interface diagram showing the entering of biographical information and other information.

FIG. 13B is a user interface diagram showing additional coverage amounts that can be selected.

FIG. 13C is a user interface diagram showing additional coverage amounts that can be selected.

FIG. 13D is a user interface diagram showing additional coverage amounts that can be selected.

FIG. 15A is a user interface diagram requesting contact information.

FIG. 15B is a user interface diagram requesting additional contact information.

FIG. 21B is a user interface diagram showing additional application information for review.

FIG. 21C is a user interface diagram showing additional application information for review.

DETAILED DESCRIPTION OF EMBODIMENTS OF THE INVENTION

Figure 1:
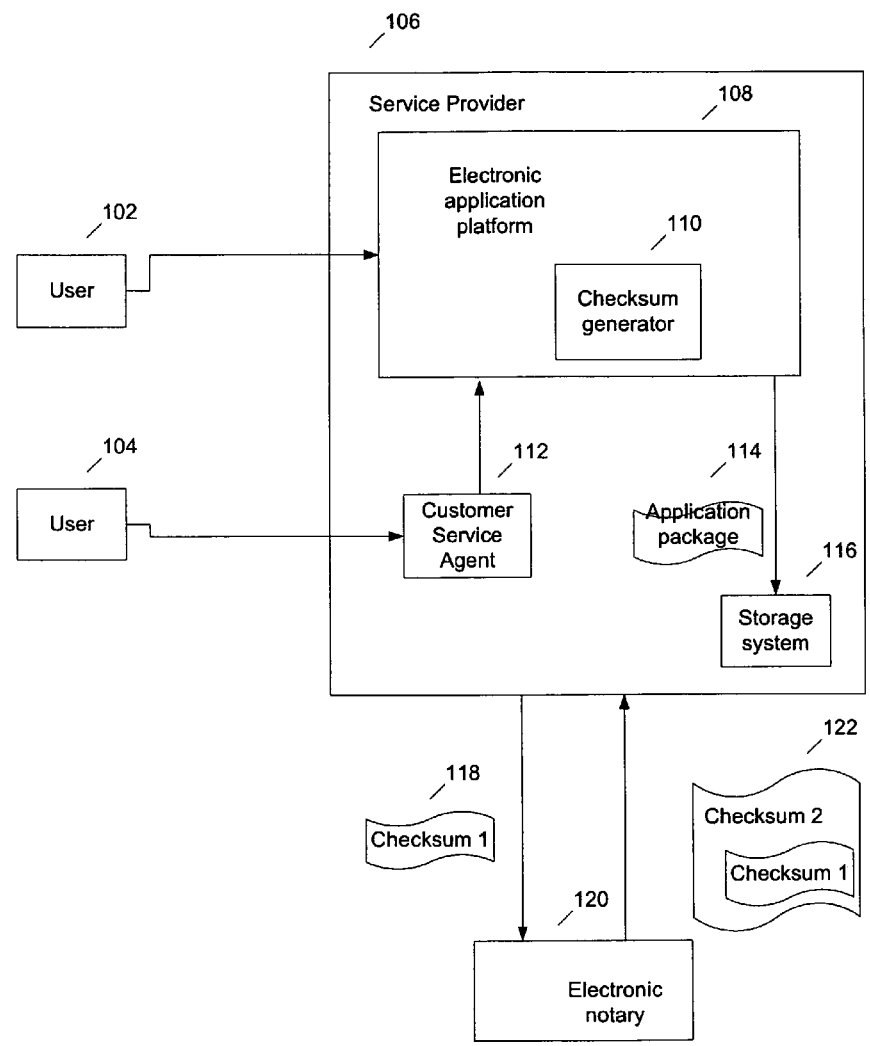
FIG. 1 is a system diagram showing the overall architecture of the tamper proof application processing system.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Embodiments of the invention are directed to tamper proof applications that have been signed with an electronic or voice signature. The term signature will be used to refer to both electronic and voice signatures. The system and method includes the signing of an application (e.g. an insurance application) either electronically or using a voice signature. The signature can include verification and identification information. For example, verification information can include providing of personal information. Identification information can include information identifying the computer or the phone number the person is calling from. The signature is electronically secured to the application. After the application has been signed, it can be locked, using both an internal checksum and an external checksum to prevent tampering by either (or both) internal or external actors.

The locking process can be applied to the application and signature. A first checksum (internal checksum or control total) is calculated based on the application and signature, and then is appended to the application to protect against external tampering. A second checksum (external checksum or control total), can be calculated to protect against internal tampering. The external checksum can be based on the internal checksum, thereby protecting the integrity of the internal checksum. In one embodiment, this is done by transmitting the internal checksum to an outside vendor or separate system for calculation of the external checksum. The external checksum is transmitted back and stored with the application. Alternative methods of protecting the application and signature may optionally be used.

In further detail, an applicant uses a device with access to the Internet to complete an online application which is provided by a client computer or server. According to an embodiment of the invention, after reviewing the completed application, the applicant electronically signs and dates the application. The client computer or server reviews the confirmation information (e.g. typed keystrokes of a person's name) and verification information (e.g. personal information) to determine that the signature corresponds to the expected values. In addition, identifying information, including the exact date and time, application number or transaction number, the Internet Protocol (IP) address of the applicant, and the version of Internet browser used by the applicant can be captured and stored as part of the signature information.

An internal checksum, for example, is calculated and appended to the application. The checksum is dependent on the contents of the application and/or the signature, including some or all of the confirmation, verification, and identification information. Should either the application or signature be altered, the calculated checksum would change significantly, allowing immediate detection of the alteration. According to one embodiment of the invention, the checksum is a SHA-1 (Secure Hashing Algorithm) hash total comprising a control total of the text of the application.

To calculate the external checksum, the internal checksum is transmitted to an outside vendor or separate system over the Internet. The outside vendor calculates an external checksum using the internal checksum as its input, and time-stamps the external checksum using PKI public-key/private-key encryption technology. This external checksum is transmitted back to the client for storage with the application. The external checksum ensures the integrity of the internal checksum. The internal checksum ensures the integrity of the rest of the application and signature information. This makes the electronic signature process of the application completely tamper-proof.

While the internal checksum is transmitted to an outside vendor, the application contents are protected and remain private. The SHA-1 algorithm is a one-way hash calculation, which ensures that the application cannot be reconstructed from the transmitted internal checksum. Each SHA-1 hash total result is unique to the underlying application and protects the integrity and privacy of the underlying application contents. The entire locking process, including transmission of the internal checksum to the outside vendor and receipt of the external checksum from the outside vendor, is seamless to the applicant and takes less than sixty seconds to complete.

An applicant can also complete an application over the phone. An agent speaks with a customer and inputs the applicant's responses into an electronic application. After reviewing the contents and accuracy of the application, the applicant signs the application by voice and/or inputs to the telephone keypad. According to one embodiment of the invention, the applicant is directed to input through the keypad and/or speak personal verification information generally known only to the applicant, such as a driver's license number or social security number. The client computer or server reviews the signature inputs to determine that the signature received corresponds to expected values. These inputs, as well as other identifying information, such as the date and time, caller ID information (e.g. phone number), and an application or call number, are recorded and digitized for storage. Calculation of the internal and external checksum is similar to that described above for the electronic signature, but they can be based on the signature received over the phone.

FIG. 1 is a system diagram showing the overall architecture of the tamper proof application processing system. The application is provided by a service provider 106 (e.g. insurance company). The system includes an electronic application platform 108, with a checksum generator 110. This electronic application platform is in communication with a storage system 116 and electronic notary 120. Applications are completed electronically by a user (applicant) 102, or over the phone by user 104 and customer service agent 112. The application package 114, including the application, an electronic or voice signature, and checksums (both internal and external) is stored in storage system 116. Internal checksum 118 is shown being sent to electronic notary 120, and external checksum 122 is shown being returned from electronic notary 120. The term checksum will be used to refer to either an internal or external checksum.

Service provider 106 is any provider selling something. For example, this can be an insurance company selling insurance to applicants. As another example, this could be a bank selling new banking services to an account holder.

User 102 (applicant) is a user desiring the service provided by service provider 106. User 102 connects to application platform 108 electronically, for example, online over the Internet. User 104 is accessing the application platform through the phone by using customer service agent 112 as an interface to the electronic application platform. The customer service agent can guide the user though the electronic application process by requesting the needed information and providing the necessary disclosures that the user would otherwise have read directly on the screen. Alternatively, user 104 can access the application platform through an interactive voice response system (IVR).

Service provider's system, or a system run by a third party for the service provider, includes an application platform 108. This can be a web based application using a standard multi-tier architecture, or a native application executing directly within an operating system. The application can be a client-server application. The application software running on application platform 108 allows users (applicants) 102 to complete applications electronically. The application software can include requests for certain information from users, as well as determine eligibility and authorize the user for a particular service. Payment and other information can also be performed though the application software. In this way, the complete application process can be performed electronically.

Electronic application platform 108 includes (or is connected to) a checksum generator 110. This checksum generator calculates an internal checksum to protect the application from external tampering. In this way, an accurate and reliable copy of the application can be maintained. The system includes a storage system 116 for storing the application package 114. This storage system can be part of the application platform or an external database or file system. The checksum generator can be applied to the application (e.g. the text of the policy) and/or the signature (which includes the confirmation, verification, and identification information). The checksum generator can also be applied to all of part of the signature, for example, it can be applied to just the verification information. The signature can also include data and time information. The signature will be described in further detail with respect to FIGS. 5 and 6.

The checksum can be generated using many methods that are known in the art. One way hashing algorithms, such as the SHA group of algorithms or MD5, can be used to generate a checksum. These one way hashing algorithms generate a small number or other small amount of information after processing a larger amount of information. Any changes to the application or signature will greatly change the checksum, allowing the modification to be detected. This internal checksum protects against external tampering. However, a person with access to the system could possibly modify the application and generate a new appropriate checksum based on the modified data.

Electronic notary 120 is an outside or third party vendor that can be used to generate an external checksum. This second check can be based on any or all of the application, signature, date and time, and the internal checksum. By applying the external checksum to the internal checksum, any internal attempt to modify the application and generate a new checksum can be detected. The internal attempt to modify the application will not be able to generate a new external checksum, particularly if the external checksum is based on the time it was generated. One example of an outside electronic notary is Digistamp, Inc. based in Dallas, Tex.

The external checksum can be based solely on the internal checksum. In this way, the application and signature data does not need to be transmitted outside the server provider 106. Because the application data cannot be recreated from the internal checksum, the security of the system is enhanced because the application data is never sent out over the Internet or other communication system. This also increases the level of privacy, because there are fewer people who could possibly view the sensitive application data. Further details of the process for generating the external checksum are described with respect to FIG. 7.

Figure 2:
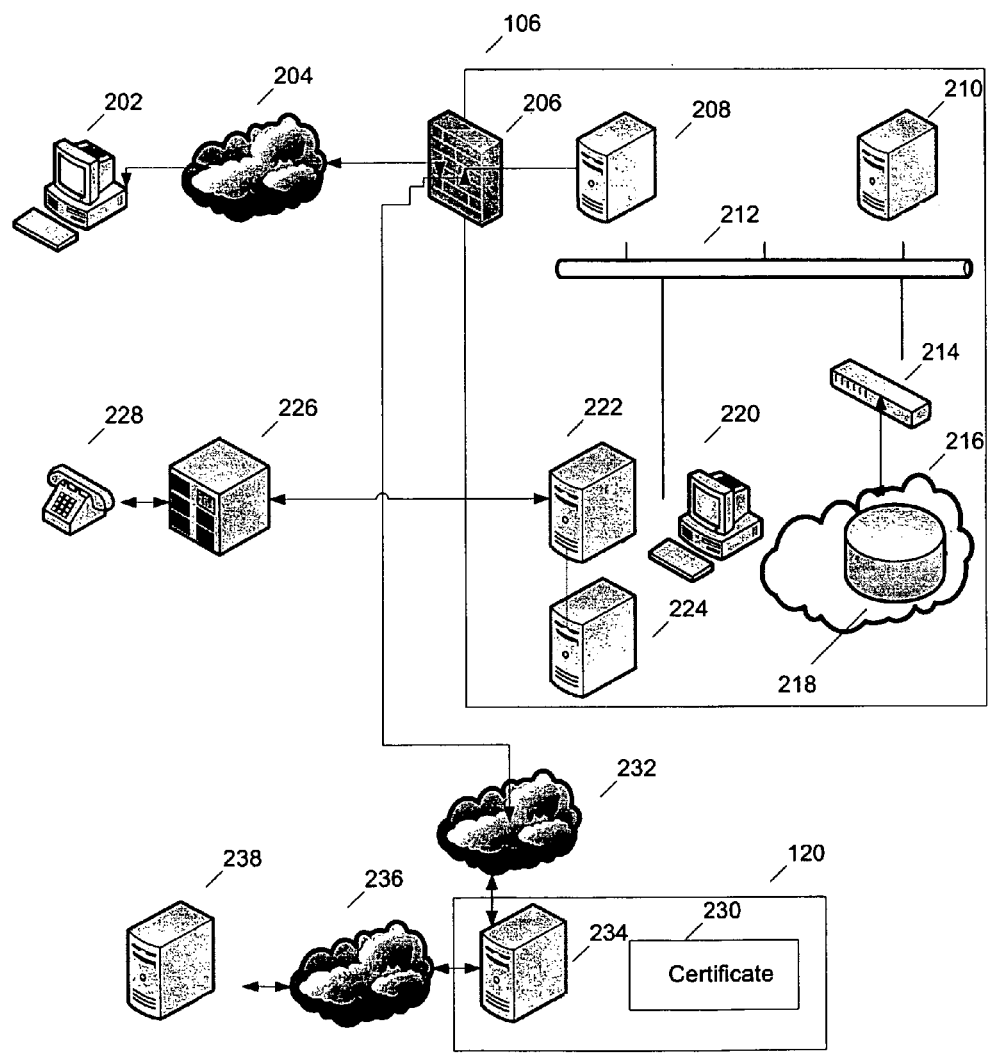
FIG. 2 is a hardware diagram showing the equipment and hardware used in the application processing system.

FIG. 2 is a hardware diagram showing the equipment and hardware used in the application processing system. This figure shows the hardware that can be used to build the tamper proof application system described in FIG. 1. User 102 can connect through a computer and communication network 204 (e.g. the Internet) to service provider 106. The service provider 106 can use a firewall 206 to increase the security of their systems. Also shown is a user 104 connecting through phone system 226 to an IVR system 222 or customer service agent using computer 220.

Service provider's systems include a firewall 206, and a computer 208 for running the electronic application platform. Connected to electronic application platform computer 208 is another computer 210 for running checksum generator 110. Alternatively, this function can be performed on computer 208. Computers 208 and 210 are connected through network 212, which can be an Ethernet network. Also attached to network 212 is an IVR system that can be used to process applications by phone. IVR 222 is shown connected to a speech processing system 224, although this functionality can be included within computer 222. Alternatively, applications can be completed through the phone using a customer service agent (not shown) who is using computer 220, in a similar way to how a user can electronically complete the application on their own using the Internet. Service provider's system is also shown to include a switch 214 for access to a storage area network 216, shown with storage 218. Of course, any type of storage system can be used (e.g. databases, file systems, network attached storage), including storage internal or directly connected to computer 208.

Firewall 206 can also be used during communication with electronic notary 120. Electronic notary is shown in communication with service provider 106 through network 232 (e.g. the Internet). Electronic notary contains a computer 236 for computing the external checksum. For example, this external checksum can be digitally signing the internal checksum and timestamp using public key cryptography. A certificate 230 for use in public key cryptography is also shown. To accurately generate timestamps, electronic notary can synchronize its time with an outside timeserver 238 though a network 236 (e.g. the Internet).

Figure 3:
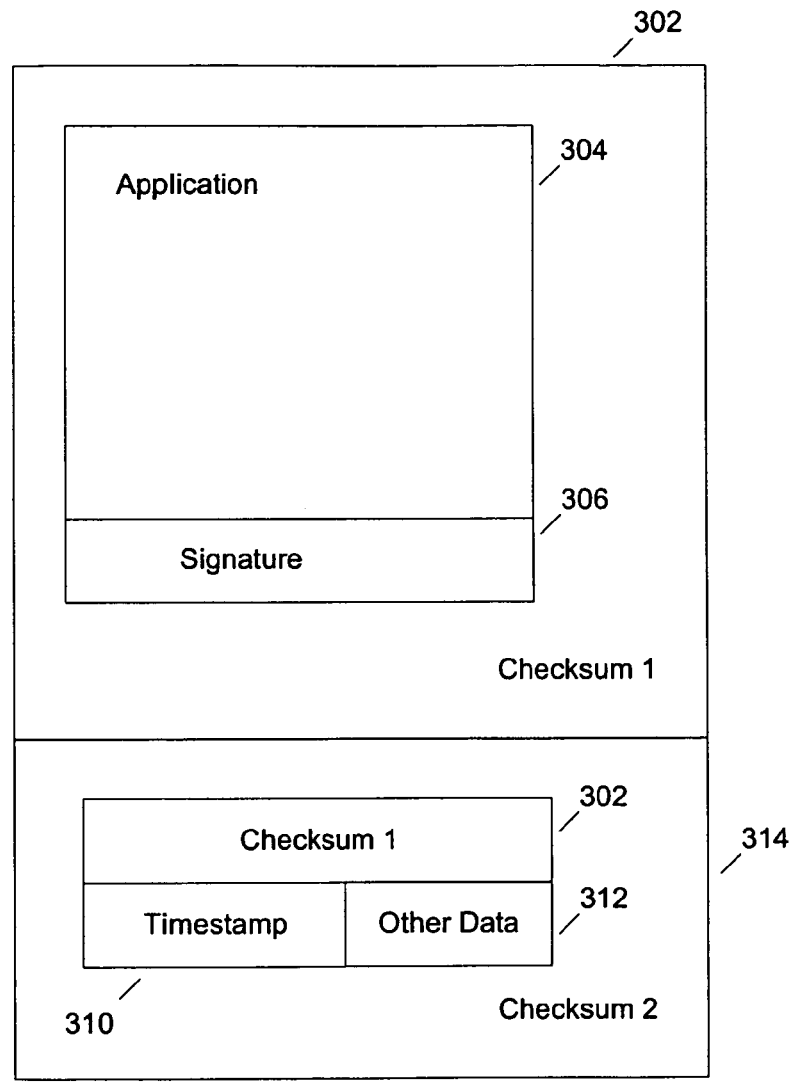
FIG. 3 is a detailed view of the application, signature, internal, and external checksums.

FIG. 3 is a detailed view of the application package 114, and includes application 304, signature 306, and checksums 302 and 314. Application 304 and signature 306 (which includes confirmation, verification, and identification information is described in more detail with respect to FIGS. 4 and 5) are shown as having been used to generate internal checksum 302. Attached to the application 304, signature 306, and internal checksum 302 is external checksum 314. Alternatively, in some embodiments of the invention, the external checksum 314 could also have been applied to the entire application 304 and signature 306, and not just the internal checksum 302.

The external checksum 314 is shown based on internal checksum 302, a timestamp 310 that records when external checksum 314 was generated, and other data 312. Other data can include information identifying or verifying from where the internal checksum 302 was received. The external checksum can be based on any or all of these components.

Figure 4:
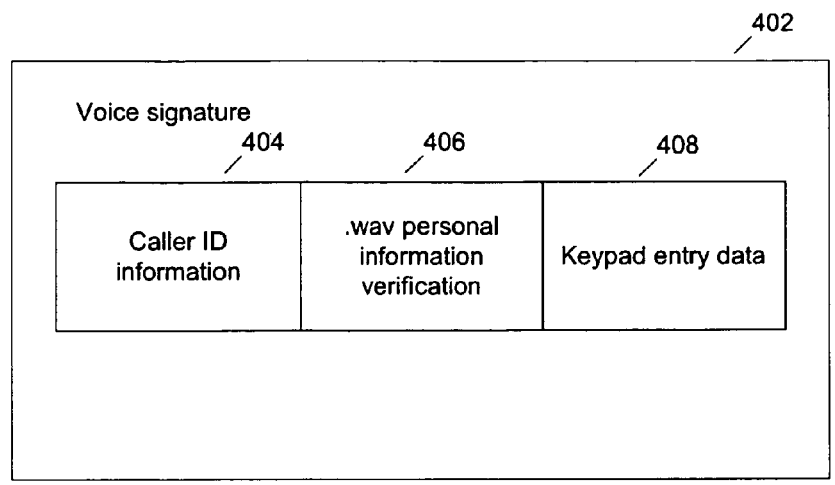
FIG. 4 is a detailed view of the voice signature.

FIG. 4 is a detailed view of the voice signature. Voice signature 402 is used when an application is made through the phone, such as through IVR system 222 or customer service agent 112. The voice signature 402 can include identification information 404 such as caller ID information. Voice signature can also include the confirmation information 406 of a digitized audio recording of the individual's verbal confirmation. For example the phrase "yes" or "I agree". The voice signature can also include verification information 408, such as keypad entry of a social security number, driver's license number, or PIN number. Alternatively, the verification information can be provided verbally and interpreted by a speech recognition engine or a customer support representative. The voice signature can also be time and date stamped, or have other identifying information such as an application number, or call number. Together the confirmation information, verification information, identification information form the voice signature.

Figure 5:
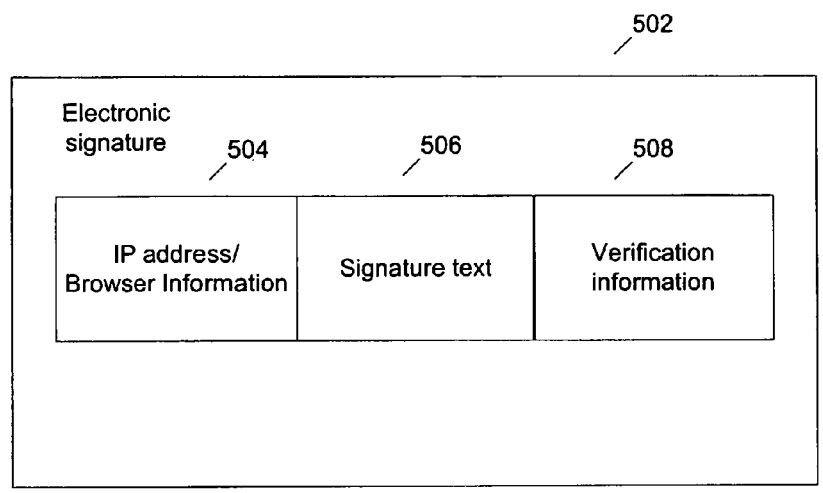
FIG. 5 is a detailed view of the electronic signature.

FIG. 5 is a detailed view of the electronic signature. The electronic signature is similar to the voice signature, except that it is provided electronically through application software, for example, through a graphical user interface. The provided electronic signature is transmitted through the Internet or other network.

The electronic signature can include identification information 504 of the computer being used to complete the application, such as the IP address of the computer, browser identification information, or other network access identifiers. This identification information can be collected automatically by the application software as the applicant is completing or signing the application. The electronic signature can also include the confirmation information, for example, the text that was entered corresponding to the applicant's name and date, or data indicating acceptance of the application. The electronic signature can also include verification information 508. This verification information can include responses to challenge questions, a PIN number, personal information generally known only to the applicant, or a user name and password. This information helps to verify the identity of the applicant. The electronic signature can also be time and date stamped, or have other identifying information such as an application number. Together, the confirmation information, the identification information, and the verification information form the electronic signature.

Figure 6:
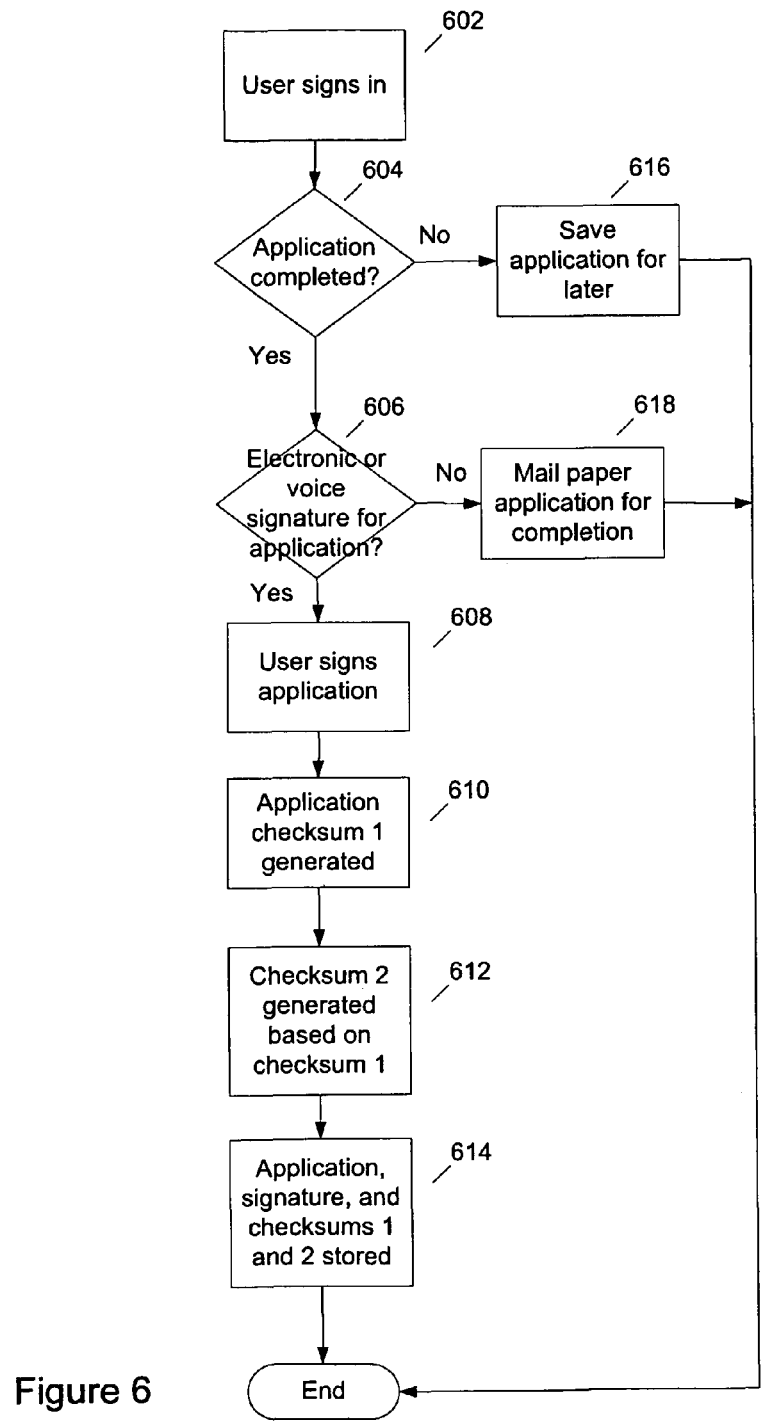
FIG. 6 is a flow diagram describing the overall application process.

FIG. 6 is a flow diagram describing the overall application process. The overall application process includes calculating an internal checksum for a completed application, and then calculating an external checksum for the completed application, including basing the external checksum on the internal checksum. The application, signature, and checksums are then stored for future access. The entire process can be done within 60 seconds, and is transparent to the applicant.

In detail, at step 602 a user signs into the application system. This information can form part of the verification information. At step 603, the applicant completes and submits their application to the system. At step 604, it is determined if the application is correct and complete. If there are errors in the application, the applicant can go back and correct these before resubmitting the application. At step 616, if the application has not been completed, it can be saved for later completion.

At step 606, an electronic or voice signature is requested for the application depending on how the applicant is completing their application. At step 608, the applicant signs the application, either by typing certain characters or through other interface elements of the application software (e.g. an "I agree" button), or for a voice signature, though a verbal confirmation. The signature can also include the providing of verification information, such as the answering of challenge questions or providing personal information. This can be either typed in or verbally provided (including through a touch tone keypad) depending on how the application is being completed.

At step 610, once the application is completed and signed, the internal checksum is generated. The internal checksum can be based on the application and/or signature. At step 612, the checksum is sent to the electronic notary 120 for generation of the external checksum. Alternatively, the external checksum can be based on the application, signature, a time stamp, and/or other information (e.g. the service provider identification, sending IP address, customer number etc.). This external checksum can be a variety of things, including time stamping and signing using public key cryptography, or generating another one way hash using the same or a different algorithm. The external checksum is sent back to the service provider. At step 614, the application package 114, including application, signature, and the checksums are stored for later access.

Figure 7:
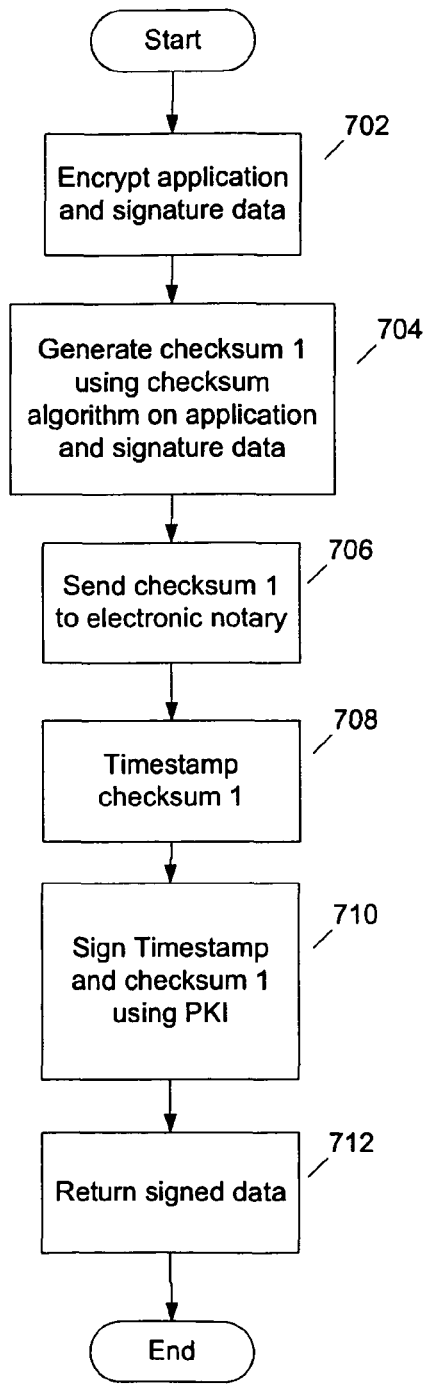
FIG. 7 is a flow diagram describing the process for generating checksums and locking the application.

FIG. 7 is a flow diagram describing the process for generating checksums and locking the application. Before generating the checksums, at step 702 the application can be encrypted (e.g. the RSA algorithm) to make reading or altering the application more difficult. At step 704, the internal checksum is generated using the application and/or signature data. As described above, the checksum can be generated using a one way hashing algorithm like SHA-1, or other algorithms from the SHA group. At step 706, the checksum, without the application or signature can be sent to the electronic notary for generation of the external checksum. At step 708, the electronic notary time stamps the incoming checksum request. To maintain accurate time, the electronic notary can synchronize its time with a time server, such as those controlled by atomic clocks or GPS. Time stamping the request provides additional data from which to generate an external checksum, as well as recording the time of the request, thereby providing extra security against tampering.

At step 710, the internal checksum is signed, for example, using public key cryptography. Public key cryptography not only ensures that the data cannot be modified, it identifies the signer of the data, for example, Digistamp Inc. The signed data is then returned to service provider at step 712.

Figure 8:
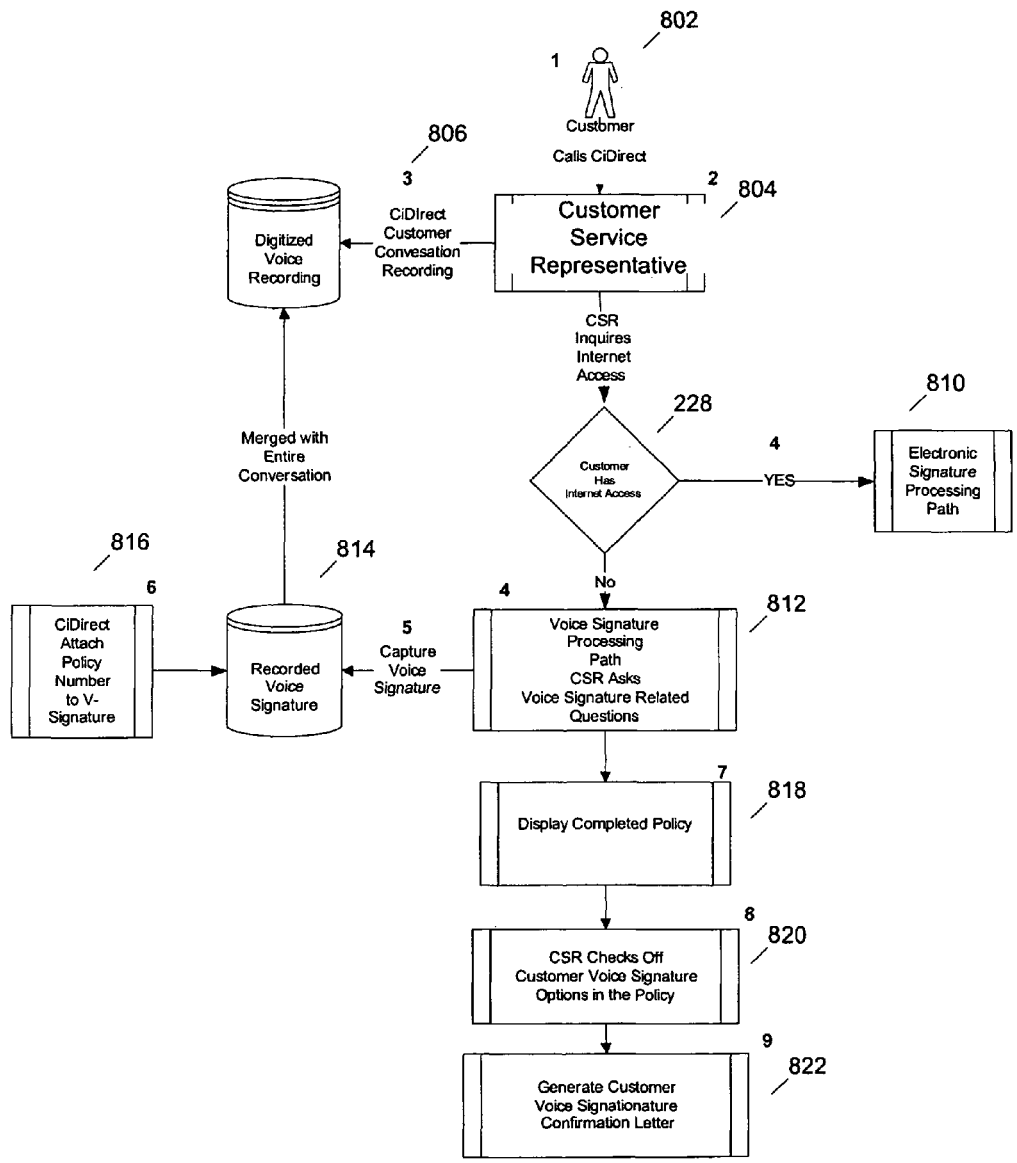
FIG. 8 is a high level flow diagram for capturing a voice signature before locking an application.

FIG. 8 is a high level flow diagram for capturing a voice signature before locking an application. At step 802, an applicant calls the service provider to begin the application process. At step 804, the applicant interacts with a customer service representative (CSR). During this process, as shown by step 806, the interaction is being recorded. Later, the relevant portions of the conversation can be extracted for a voice signature. Alternatively, recording can begin, or a separate recording can be made, specifically for the voice signature.

At step 808, the CSR determines if the applicant has internet access, if so at step 810 they are requested to begin the application online and use an electronic signature. Otherwise, at step 812, the application is completed over the phone with the CSR. The CSR asks the required questions and provides the required disclosures. At the end of the phone application process (step 814), the voice signature is recorded. At step 816, a policy number is attached to the recorded voice signature.

At step 818, a completed policy is displayed. At step 820, the CSR checks off that a voice signature was used to sign the policy. At step 822, a letter is generated informing the customer that a voice signature was used and that the application process is complete.

Figure 9:
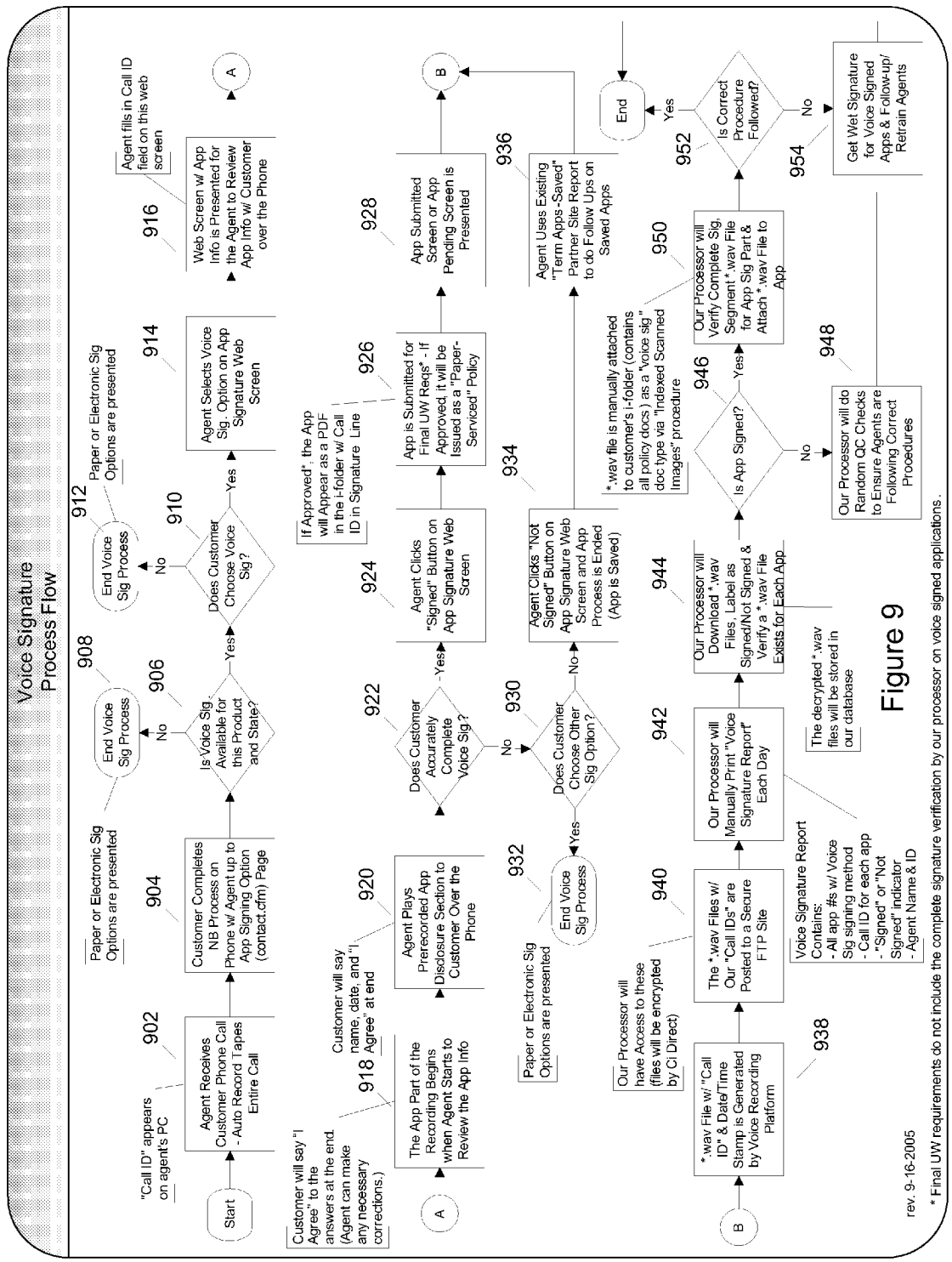
FIG. 9 is a detailed flow diagram for capturing a voice signature before locking an application.

FIG. 9 is a detailed flow diagram for capturing a voice signature before locking an application. The process for capturing a voice signature involves questions for the applicant, and tasks performed by the CSR. The process begins at step 902 where the CSR receives a call. The entire call is recorded. At step 904, the applicant completes the new business process on the phone with the CSR, up to the point where a voice signature is needed. At step 906, it is determined if the state in which the applicant is applying for the product allows voice signatures. At step 908, if voice signatures are not allowed, the phone application process is stopped, and the applicant can complete the process using a paper or electronic signature.

At step 910, if voice signatures are allowed, the applicant is asked if they would like to use that option. At step 912, similar to step 908, if the applicant does not wish to use a voice signature, they can complete the application using a paper or electronic signature. At step 914, the CSR selects the voice signature option for the application using the user interface provided by the service provider's application software. At step 916, information is presented to the CSR for reviewing the application. At this point, the CSR can fill in caller ID information, application number, a call identification, or other information about the caller for identification purposes.

At step 918, recording is started (if necessary) as the application is reviewed with the applicant. At step 920, a prerecorded disclosure can be played for the applicant over the phone. Alternatively, this disclosure can be provided by the CSR. At step 922, it is determined if the voice signature was correctly completed by the applicant. If so, then at step 924 the CSR indicates that the application was properly signed through the service provider's application. At step 926, the application is submitted for final approval. If the application is finally approved, the CSR will be notified and provided with a copy of the application as a PDF file. The application can also have assigned to it an application number (instead of simply a call number) or policy number. At step 928, a confirmation pending screen is shown so that the CSR knows that the application has been submitted and final processing is still being completed.

At step 930, if the application was not properly voice signed, it is determined if the applicant choose another signature option. At the step 932, the process ends and the applicant is presented with the paper and electronic signing options. At step 934, if the customer did not complete the voice signature, and did not choose another signature option, the CSR selects that the application is not signed. The application process is ended, and the application is saved. At step 936, the CSR can generate a report of saved applications to assist them with following up on saved applications so that they can be completed.

At step 938, the recording of the voice signature (e.g. the .wav file) along with caller ID information, call number, and a timestamp is generated by the system. At step 940, all the generated information is posted to a secure FTP site. At step 942, the system, or an outside vendor can generate a voice signature report, summarizing the applications that were signed with a voice signature. This report includes all the applications with the voice signature as the signing method. The report also includes the application or call number for each application and a signed or not signed indication. Finally, the report indicates the CSR name and ID. At step 944, the .wav files can be downloaded and verified to determine if those applications have been properly signed. The .wav files are also stored in a database for later retrieval and further processing during the locking process. At step 946, if the application is verified as being properly signed, the digitized audio signature will be attached to the application and stored for locking the application. Otherwise at step 948, the application is rejected.

Random quality control checks can also be performed to ensure that proper procedures are being followed. For example, at step 952, it can be determined if the correct procedures were followed during the application process of a particular call. At step 954, the application can still be completed by obtaining a correct voice signature, otherwise a paper or electronic signature can be used as a substitute. CSRs can also be retrained or further instructed to improve the quality of applications and compliance to procedures.

Figure 10:
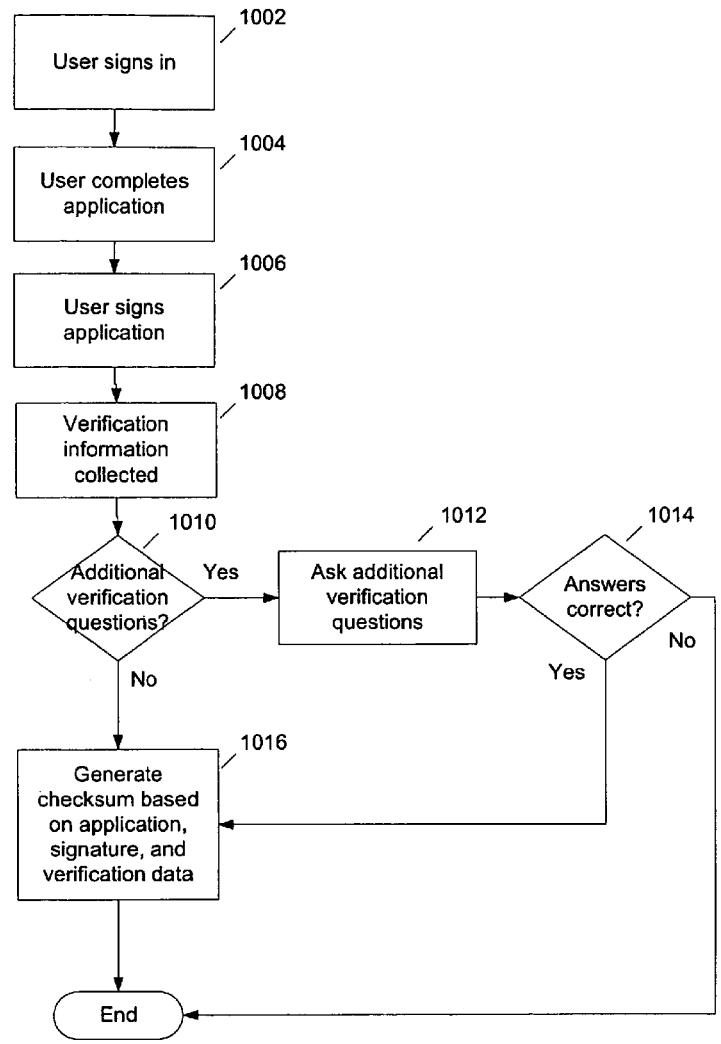
FIG. 10 is flow diagram for electronically signing an application before it is locked.

FIG. 10 is flow diagram for electronically signing an application before it is locked. The process is similar to that described for the voice signature, but includes the automatic collection of information by the application system. At step 1002, the applicant signs into the application system to begin completing their application. At step 1004, the applicant completes their application, and at step 1006 they sign their application. At step 1008, the application system collects identification information from the applicant's computer. This information can be automatically collected from the responses from applicant's computer. For example, the IP address of applicant's computer is provided in the response IP packets, while the browser identification string is provided by the HTTP GET request issued by applicant's web browser. At step 1010, it is determined if additional verification questions are to be asked. This can be done when insufficient identification information has been provided, or when additional confidence in the applicant's identity is desired. At step 1012, the verification questions are asked. These questions can include questions of personal information, such as a social security number, or predetermined challenge questions (e.g. a favorite color). At step 1014, the entered responses are compared to the stored information to determine if they are correct. If the responses are correct, then at step 1016, the checksums are generated based on the application and signatures. Otherwise the application process ends.

Figure 11:
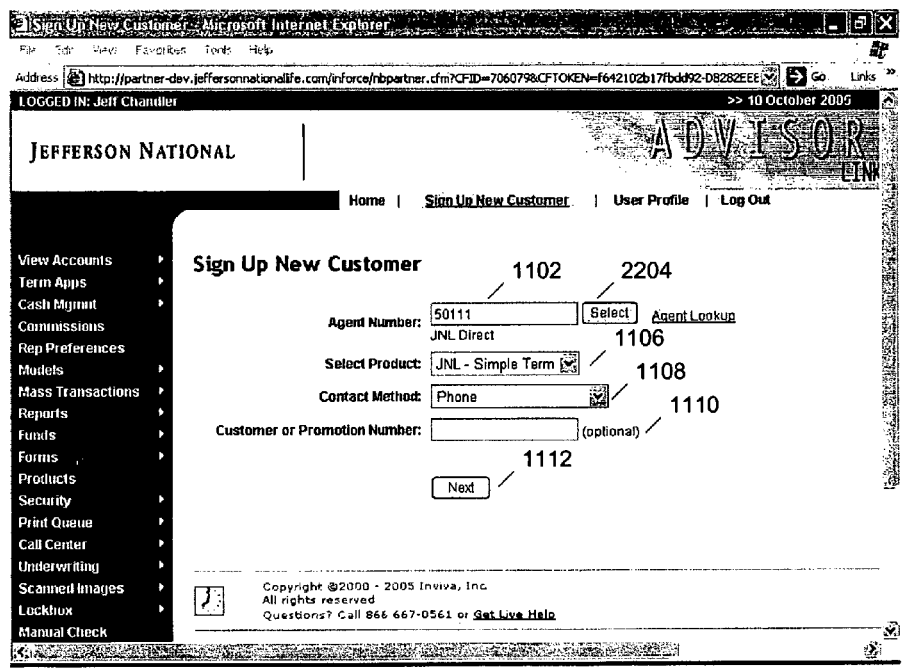
FIG. 11 is a user interface diagram showing how a customer server agent (CSR) can begin the application process.

FIG. 11 is a user interface diagram showing how a customer server agent (CSR) can begin the application process for providing insurance. The user interface allows the CSR to enter their agent number, or to search for it using the agent lookup 1104. Using drop down box 1106, the CSR can select the type of product the applicant wishes to apply for. Drop down box 1108 allows the CSR to enter how they were contacted (e.g. phone, in person). A promotion number for a marketing campaign can be entered in field 1110. The CSR can move to the next part of the application process using button 1112.

Figure 12:
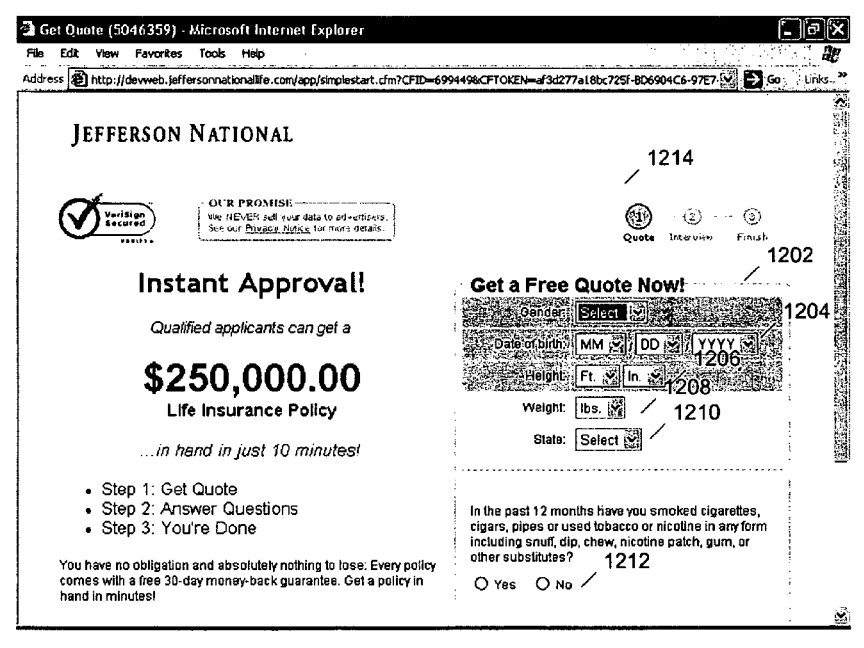

FIG. 12 is a user interface diagram showing the entering of biographical information and other information, which are related to providing insurance for the applicant. The interface includes fields for the entry of gender 1202, date of birth 1204, height 1206, weight 1208, and state of residence 1210. The state of residence can determine which policy is being provided. For example, insurance policies for certain states may have different coverage terms. This interface can also include one or more specific lifestyle questions 1212 to help determine the risk in providing insurance to this individual. The interface also provides an overall navigation guide 1214 to assist the CSR through the application process.

Figure 13A:
FIG. 13A is a user interface diagram showing how the coverage amount can be selected.

FIG. 13A is a user interface diagram showing how the coverage amount can be selected. The user interface shows one or more 30 year term life insurance policies that can be selected. For each policy, the amount of the policy 1302, the monthly premium 1304, and the yearly premium 1306 is shown. Using button 1308 the CSR can select a particular policy according to the applicant's choice.

FIG. 13B is a user interface diagram showing additional coverage amounts that can be selected. This figure shows additional 30 year term life insurance policies as well as 20 year term life insurance policies with similar information to that shown in FIG. 13A.

FIG. 13C is a user interface diagram showing additional coverage amounts that can be selected. This figure shows 15 year term life insurance policies with similar information to that shown in FIG. 13A.

FIG. 13D is a user interface diagram showing additional coverage amounts that can be selected. This figure shows 10 year term life insurance policies with similar information to that shown in FIG. 13A.

Figure 14A:
FIG. 14A is a user interface diagram requesting information about the applicant.

FIG. 14A is a user interface diagram requesting information about the applicant. These questions help determine the risk the individual presents as related to providing insurance, and consequently helps determine the premium the individual will pay for their insurance policy.

Figure 14B:
FIG. 14B is a user interface diagram requesting additional information about the applicant.

FIG. 14B is a user interface diagram requesting additional information about the applicant.

Figure 15A:
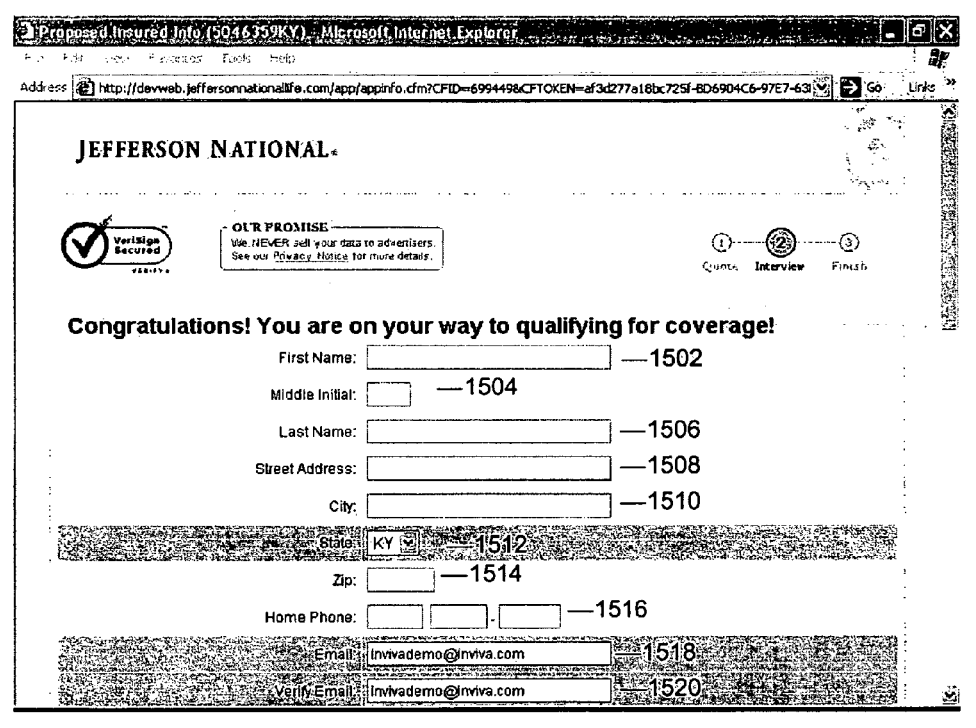

FIG. 15A is a user interface diagram requesting contact information. This contact information is used to contact the applicant after the policy is issued. It includes a first name 1502, a middle initial 1504, a last name 1506, a street address 1508, a city 1510, a state 1512, a zip code 1514, a phone number 1516, an email address 1518, and confirmation of that email address 1520.

Figure 15B:
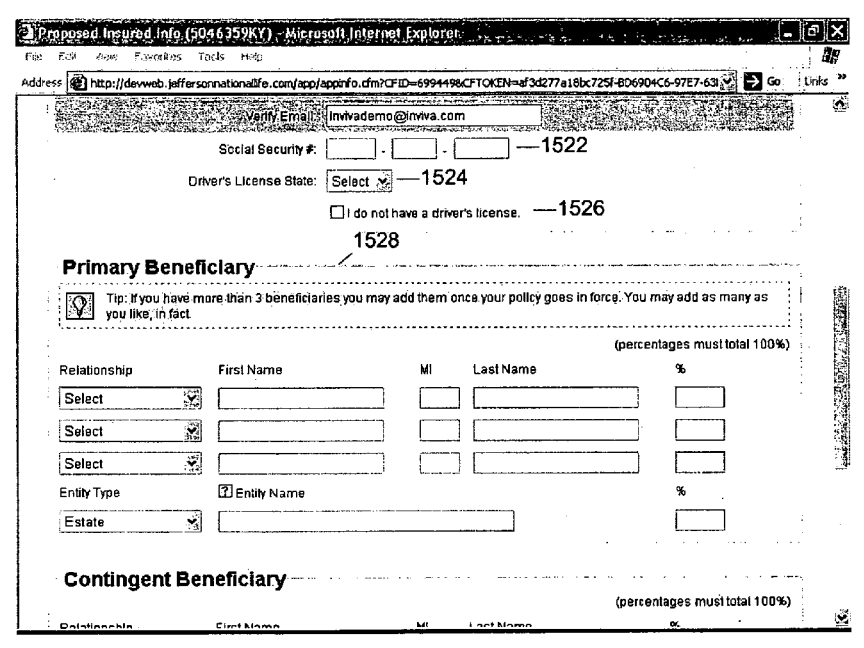

FIG. 15B is a user interface diagram requesting additional contact information and beneficiary information. A social security number 1522 and a driver's license state 1524 is also requested. Checkbox 1526 allows the CSR to indicate that the applicant does not have a driver's license. Primary beneficiary information section 1528 allows the applicant to designate a beneficiary for their insurance policy.

Figure 15C:
FIG. 15C is a user interface diagram requesting additional contact information.

FIG. 15C is a user interface diagram requesting additional contact information and beneficiary information. Contingent beneficiary information section 1530 allows the applicant to designate a contingent beneficiary for their life insurance policy.

Figure 16A:
FIG. 16A is a user interface diagram requesting authorization information for an agent.

FIG. 16A is a user interface diagram requesting authorization information for an agent who is completing an application in person for an individual. The form can be used by the agent to enter their own electronic signature, which includes verification by typing in their name and a date. In this way, it can be assured the individual is working with a qualified agent.

Figure 16B:
FIG. 16B is a user interface diagram requesting additional authorization information for an agent.

FIG. 16B is a user interface diagram requesting additional authorization information. This interface allows the agent to submit their electronic signature to the system for verification of their authorization and for recordation along with the application.

Figure 17:
FIG. 17 is a user interface diagram requesting physician information.

FIG. 17 is a user interface diagram requesting physician information. This interface allows a CSR to enter an applicant's physician information. This information includes a first name 1702, a last name 1704, a facility name 1706, a street address 1708, a city 1710, a state 1712, a zip code 1714, and an office phone 1716. This interface also includes a checkbox 1718 to indicate whether the individual has seen a physician in the last 12 months for a routine check up or prescription.

Figure 18A:
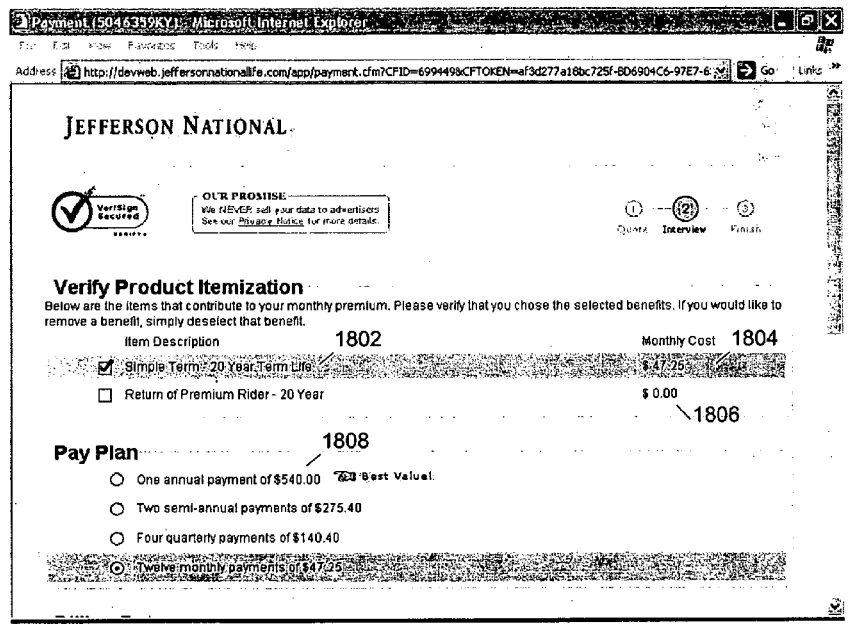
FIG. 18A is a user interface diagram showing cost of the insurance and payment options.

FIG. 18A is a user interface diagram showing the cost of the insurance and payment options. The interface shows the selected product, the monthly cost, and the additional cost 1806 for return of the premium rider. The payment plan section allows the applicant to select the type of payment plan they would like.

Figure 18B:
FIG. 18B is a user interface diagram showing additional payment options.

FIG. 18B is a user interface diagram showing additional payment options. The interface allows the CSR to select for the applicant their preferred billing date 1810, the term and coverage amount 1812, and the method of payment 1814 (e.g. credit, debit, electronic funds transfer, etc.)

Figure 19:
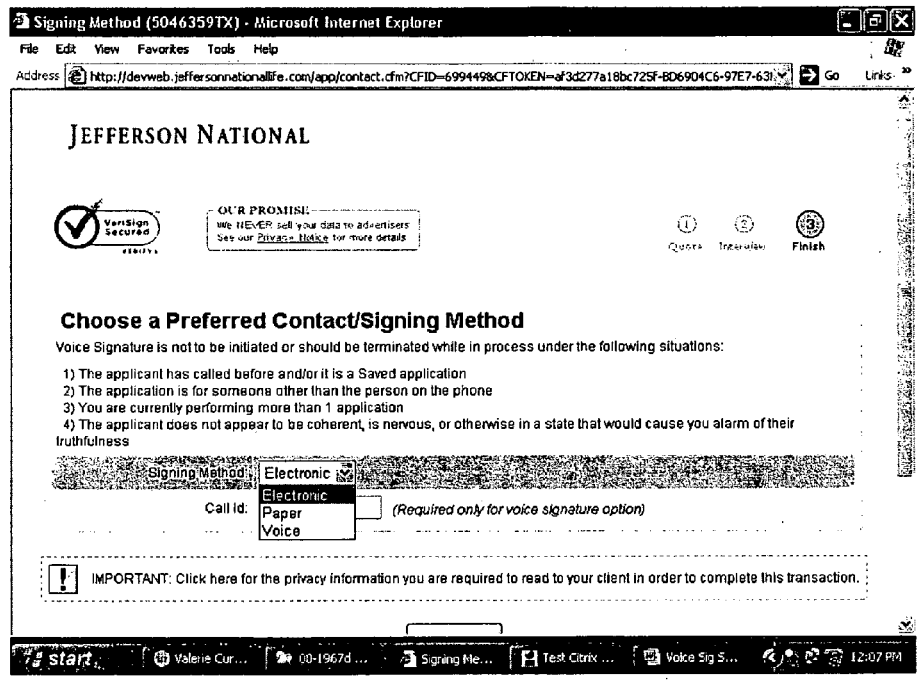
FIG. 19 is a user interface diagram showing how the method of signing is selected.

FIG. 19 is a user interface diagram showing how the method of signing is selected. FIG. 19 allows the CSR to select the method of signing the applicant would like to use. The process for signing an application electronically or using a voice signature is described above.

Figure 20:
FIG. 20 is a user interface diagram showing additional details for a voice signature.

FIG. 20 is a user interface diagram showing additional details for a voice signature. Once a CSR has selected voice signature, the subsequent screen of the application allows them to enter the call ID 2002 to help identify the caller.

Figure 21A:
FIG. 21A is a user interface diagram showing the application information for review.

FIG. 21A is a user interface diagram showing the application information for review. This interface allows the CSR to review with the applicant all the entered information, including their biographical information, their answers to specific questions, the type of insurance policy they would like, and their payment terms.

FIG. 21B is a user interface diagram showing additional application information for review by the CSR and applicant.

FIG. 21C is a user interface diagram showing additional application information for review by the CSR and applicant.

Figure 21D:
FIG. 21D is a user interface diagram showing additional application information for review.

FIG. 21D is a user interface diagram showing additional application information for review by the CSR and applicant.

Figure 22A:
FIG. 22A is a user interface diagram showing disclosures for the sales agent to make to the customer.

FIG. 22A is a user interface diagram showing disclosures for the CSR to make to the customer. These disclosures include instructions for the CSR, and the actions required by the applicant for a proper voice signature.

Figure 22B:
FIG. 22B is a user interface diagram showing additional disclosures for the sales agent to make to the customer.

FIG. 22B is a user interface diagram showing additional disclosures for the CSR to make to the customer. After hearing the applicant's response to the disclosures, and the following of the voice signature instruction, the CSR can use this interface to indicate whether the application has been properly signed 2202, not signed 2204, or whether the application process should be aborted 2206.

Figure 23:
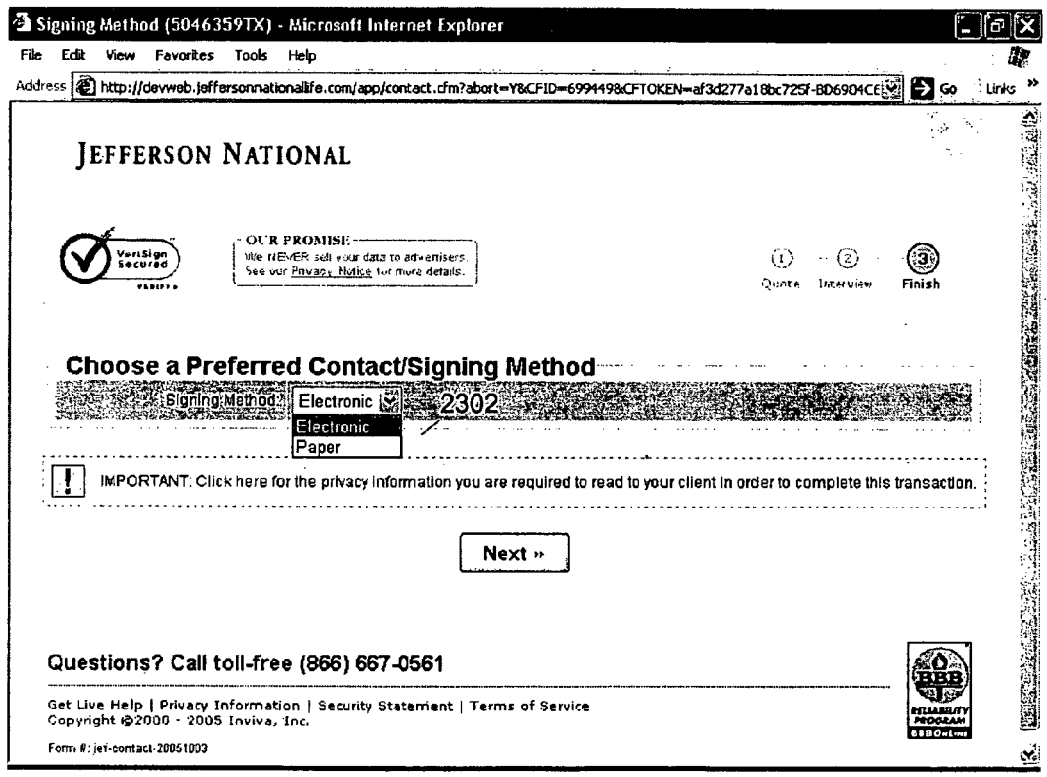
FIG. 23 is a user interface diagram showing how an electronic signature can be selected.

FIG. 23 is a user interface diagram showing how an electronic signature can be selected. If the applicant decides on the phone that they would like the sign the application either electronically or by paper, the CSR can use drop down box 2302 to select the applicant's choice.

Figure 24:
FIG. 24 is a user interface diagram showing saving an application for later.

FIG. 24 is a user interface diagram showing how to save an application for later completion. This interface allows a CSR to save an application for later completion, for example, when the process has been aborted, or the applicant has chosen an alternative signature method. To save the application for later, the CSR enters their user ID 2402, the applicant's email 2404, a password 2406, and a password confirmation 2408.

Figure 25:
FIG. 25 is a user interface diagram updating the CSR of the application process.

FIG. 25 is a user interface diagram updating the CSR on the application process.

Figure 26:
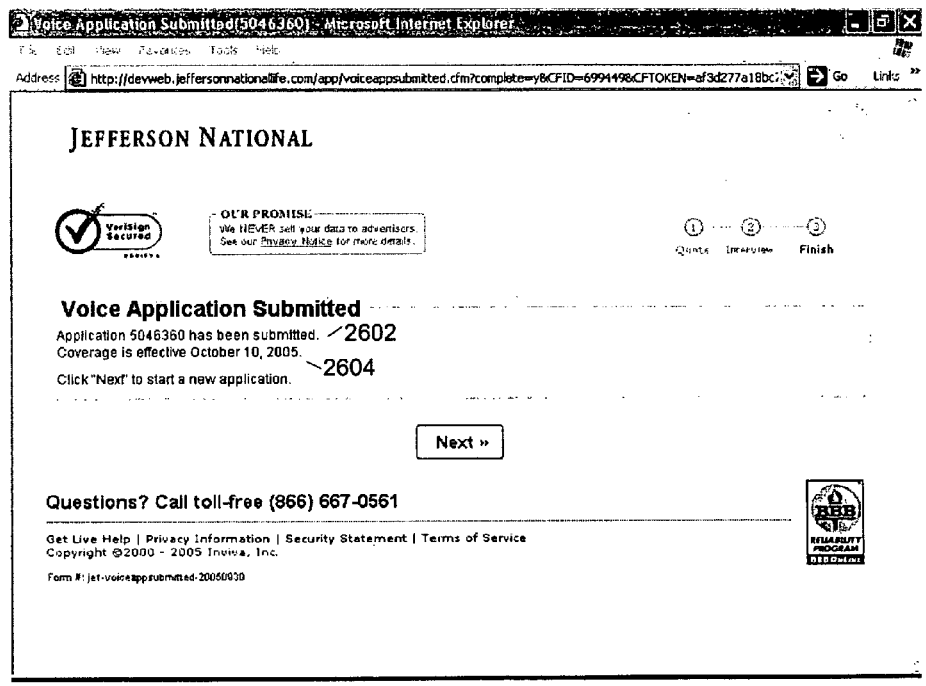
FIG. 26 is a user interface diagram confirming the application submission.

FIG. 26 is a user interface diagram confirming submission of the application. This interface confirms the application number 2602 and the effective coverage date 2604.

The above user interface figures describe just one embodiment of the invention, which is an embodiment as a web application. A similar application can be designed for use by applicants when they are applying directly over the Internet. Other types of application systems can also be designed, for example, those designed for mobile browsers or those built as native applications executing on an operating system. The above application system for providing insurance is represents one example of the type of product than can be provided by the embodiments of the invention. Embodiments of the invention can be used with any product or service involving an application process where tamper proof applications are desired.

Other embodiments, extensions and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention and the entirety of the invention should be regarded so as to allow for such design modifications and future developments within the scope of the present disclosure. The present invention is limited only by the claims that follow.

What is claimed is:

1. A method for locking an application comprising:
   (a) receiving, over a communication network from a remote applicant, a signature for an application, wherein the signature includes:
      (1) a date and time,
      (2) an indication of agreement to the terms of the application, and
      (3) verification information, personal to the applicant and capable of confirming the applicants identity;
   (b) generating an internal checksum based on the application and signature;
   (c) sending the internal checksum to a third party;
   (d) receiving an external checksum from the third party, wherein the external checksum is based on the internal checksum and the time the external checksum was generated;
   (e) associating the internal and external checksums with the application; and
   (f) storing the application, signature, internal checksum, and external checksum.

2. The method of claim 1, wherein the signature further includes:
(4) information identifying the remote applicant.

3. The method of claim 2, wherein the information identifying the remote applicant is at least one an IP address and a browser identification string.

4. The method of claim 2, wherein the information identifying the remote applicant is a phone number.

5. The method of claim 1, wherein the signature further includes:
(5) an automatically generated application number.

6. The method of claim 1, wherein the indication of agreement to the terms of the application is at least one of a verbal response from the applicant, entered by the applicant through a telephone keypad, and entered through a graphical user interface of a computer system.

7. The method of claim 1, wherein the received external checksum was generated using public key cryptography.

8. The method of claim 1, wherein the verification information is at least one of a driver's license number, a social security number, and a PIN number.

9. The method of claim 1, wherein the verification information is at least one of a verbal response from the applicant, entered through a graphical user interface of a computer system, and entered by the applicant through a telephone keypad.

10. The method of claim 1, wherein the internal checksum is generated using a Secure Hash Algorithm.

11. The method of claim 1, wherein the external checksum is additionally based on at least one of the application, the signature, and information identifying the source of the internal checksum.

12. A system for locking an application comprising:
(a) a signature for an application, received over a communication network, wherein the signature includes:
(1) a date and time,
(2) an indication of agreement to the terms of the application, and
(3) verification information, personal to the applicant and capable of confirming the applicants identity;
(b) a checksum generator for generating an internal checksum based on the application and signature, where internal checksum is sent to a third party;
(c) an external checksum received from the third party, wherein the external checksum is based on the internal checksum and the time the external checksum was generated;
(d) a storage system for storing the application, signature, internal checksum, and external checksum, wherein the internal and external checksums are associate with the application before storing.

13. The system of claim 12, wherein the signature further includes:
(4) information identifying the remote applicant.

14. The system of claim 13, wherein the information identifying the remote applicant is at least one an IP address and a browser identification string.

15. The system of claim 13, wherein the information identifying the remote applicant is a phone number.

16. The system of claim 12, wherein the signature further includes:
(5) an automatically generated application number.

17. The system of claim 12, wherein the indication of agreement to the terms of the application is at least one of a verbal response from the applicant, entered by the applicant through a telephone keypad, and entered through a graphical user interface of a computer system.

18. The system of claim 12, wherein the received external checksum was generated using public key cryptography.

19. The system of claim 12, wherein the verification information is at least one of a driver's license number, a social security number, and a PIN number.

20. The system of claim 12, wherein the verification information is at least one of a verbal response from the applicant, entered through a graphical user interface of a computer system, and entered by the applicant through a telephone keypad.

21. The system of claim 12, wherein the internal checksum is generated using a Secure Hash Algorithm.

22. The system of claim 12, wherein the external checksum is additionally based on at least one of the application, the signature, and information identifying the source of the internal checksum.

\* \* \* \* \*